United States Patent [19]

Ikeda

[11] 4,256,312

[45] Mar. 17, 1981

[54] TURN TABLE DEVICE FOR RECORD PLAYERS

[75] Inventor: Makoto Ikeda, Machida, Japan

[73] Assignee: R & D Office Makoto Ltd., Tokyo, Japan

[21] Appl. No.: 20,098

[22] Filed: Mar. 13, 1979

[30] Foreign Application Priority Data

May 18, 1978 [JP] Japan .................................. 53/59088

[51] Int. Cl.[3] ................................................ G11B 3/60

[52] U.S. Cl. ............................... 369/269; 308/DIG. 1

[58] Field of Search ..................... 308/9, 157, DIG. 1; 274/9 R, 23 A, 39 A, 39 R

[56] References Cited

U.S. PATENT DOCUMENTS

| | | | |
|---|---|---|---|
| 2,729,106 | 1/1956 | Mathiesen | 308/9 |
| 2,929,671 | 3/1960 | Taylor | 308/9 |
| 3,103,364 | 9/1963 | Macks et al. | 308/DIG. 1 |
| 3,674,278 | 7/1972 | Bowerman | 274/39 A |
| 3,759,588 | 9/1973 | Anderson | 308/9 |
| 3,988,024 | 10/1976 | Watanabe et al. | 274/39 A |
| 4,120,504 | 10/1978 | Brecht | 274/39 R |
| 4,132,414 | 1/1979 | Dinsdale | 274/39 R |

FOREIGN PATENT DOCUMENTS

| | | | |
|---|---|---|---|
| 1112010 | 5/1968 | United Kingdom | 274/9 B |

*Primary Examiner*—John W. Shepperd

*Attorney, Agent, or Firm*—Kerkam, Stowell, Kondracki & Clarke

[57] ABSTRACT

An air supported turntable assembly comprises a rotatable member having a center pin thereon and a stationary member secured to a base plate of a record player. One member is made in a frustoconical or conical configuration with its axis aligned with the axis of the center pin. The other member is made with a frustoconical or conical recess which is complementary to the configuration of the one member. The recess receives the one member with its axis aligned with the axis of the center pin. A plurality of orifices are formed in the inclined portion of the stationary member to discharge air uniformly toward the inclined portion of the rotatable member. The arrangement is effective in preventing any off-center movement of the turntable in operation.

6 Claims, 6 Drawing Figures

AIR
AIR

TURN TABLE DEVICE FOR RECORD PLAYERS

FIELD OF THE INVENTION

This invention relates to a turntable device for record players and more specifically to an air supported turntable device which has a rotatable member floatingly supported by air or other gas.

BACKGROUND OF THE INVENTION

Conventionally a record player has been known as having a turntable adapted to be rotatably supported through a center shaft provided at the center of the lower surface thereof. The shaft is rotatably supported through a bearing mechanism on a base plate of the player so that a smooth rotation of the turntable is ensured. In order to provide a high quality reproduction, it is necessary that the turntable be uniformly and constantly rotated without any off-center movement such as wow or flutter. To this end, the turntable has been designed in such a manner that it has a substantial weight with a uniform distribution of the weight throughout the turntable so that a high moment of inertia is provided. But, the conventional turntable cannot be made heavy enough to provide a very high inertia because the turntable is supported by only the center shaft.

Further, the presence of even a very slight gap between the center shaft of the turntable and the bearing mechanism will seriously affect the rotation of the turntable to cause irregular or non-uniform rotation. It therefore is required that the shaft and its bearing be precisely manufactured.

An air supported turntable assembly has been described in the U.S. Pat. No 3,479,038. The turntable described in the patent is floatingly supported by air which is introduced in the form of jets to an interface between the turntable and the base plate. Since the turntable is totally supported by air introduced through holes in the base, it is possible to increase the weight of the turntable as compared with that in the conventional arrangement. Such turntable having an increased weight can produce a high moment of inertia sufficient to ensure uniform and constant rotation of the turntable so that a high quality reproduction can be provided.

However, even in this type of turntable, it has been necessary that a center shaft be provided at the center of the lower surface of the turntable to rotate the turntable about the base plate. The shaft and the bearing mechanism are required to be precisely and accurately finished to avoid even slight irregularity or clearance. Precision manufacturing requires great skill in working and precision products are costly. Further, it is very difficult, or substantially impossible, to make a shaft and bearing which, when combined, are completely free from such an irregular clearance. In fact, it has been experienced that the turntable rotates with a small off-center movement. The off-center movement is preceived as undesired wow and flutter by the listener.

OBJECTS OF THE INVENTION

Accordingly, it is a principal object of the invention to provide an improved air supported turntable assembly which does not hve such center shaft and bearing associated therewith whereby high precision manufacturing is not required for avoiding off-centered movement of the turntable.

It is anothe object to provide an air supported turntable in which the rotatable member is completely mechanically separated from the base plate so as to be high vibration proof.

It is still another object to provide an air supported turntable by which a high moment of inertia can be obtained to ensure very stabilized rotation of the turntable.

It is an even further object to provide a record player which utilizes the above-mentioned improved air supported turntable.

SUMMARY OF THE INVENTION

The present invention in general relates to an air supported turntable assembly for record player adapted to be used with a record disc having a center hole, which includes a rotatable member having an upper surface provided with a center pin to receive the center hole of the record disc and a lower surface facing base plate means, and means for introducing pressurized air between the base plate means and the lower surface of the rotatable member to float and freely and frictionlessly rotate the rotatable member with the record disc.

According to the teaching of the invention, the air supported assembly conprises a stationary member provided beneath the rotatable member and having an upper surface facing the lower surface of the rotatable member. One of the upper surface of the stationary member and the lower surface of the rotatable member is of at least a part-conical configuration having a longitudinal axis coaxial with the center pin on the rotatable member. The other surface is provided with a recess which is complementary to the part-conical configuration to receive the one surface in a coaxial manner. A plurality of orifices are formed in the upper conical surface of the stationary member and are connected to pressurized air between the rotatable and stationary members so that the rotatable member is supported above the stationary member.

According to the invention, it is not required that a center shaft be provided at the lower surface of the rotatable member. Off-center movement of the turntable can thus be prevented so that there is no wow or flutter upon reproducing the information on the record disc. Music or the like will be reproduced with excellent quality. Further, no precisely manufactured shaft-and-bearing combination for rotating the turntable is necessary.

In one embodiment of the invention, the stationary member is formed with a frustoconical configuration. The complementary recess is formed on the lower surface of the rotatable member. In another embodiment, the stationary member has a conical configuration and the rotatable member is recessed in the complementary configuration. In these embodiments, the distribution of the weight is incrementally increased from the center to the outermost edge so that the moment of inertia which is produced to stabilize the rotation of the turntable is higher than can be obtained with the flat plate-like turntable.

Alternatively, the lower surface of the rotatable member may be formed in a downward raised conical configuration and the cmplementary recess may be formed on the upper surface of the stationary member.

Further, an upright circular flange may be provided at the outermost edge of one of the members to encircle a part of the upright periphery of the other so as to facilitate the stabilized rotation of the movable member.

Use may be made of a belt or string drive system, an idler wheel drive system, or a direct drive as driving means for rotating the rotatable member. A direct drive system is generally most preferable. In one embodiment of the present invention employing a direct-drive system, the fixed coil elements of a motor are secured in the cylindrical recess wich is formed in the upper surface of the fixed member. The moving magnet elements of the motor are secured at the lower surface of the movable member. There is no lateral pulling force in such direct drive system.

Other objects and advantages of the invention will be apparent from the following descriptions of preferred embodiments taking reference to the accompanying drawings.

DETAILED DESCRIPTION OF THE INVENTION

Figure 1:
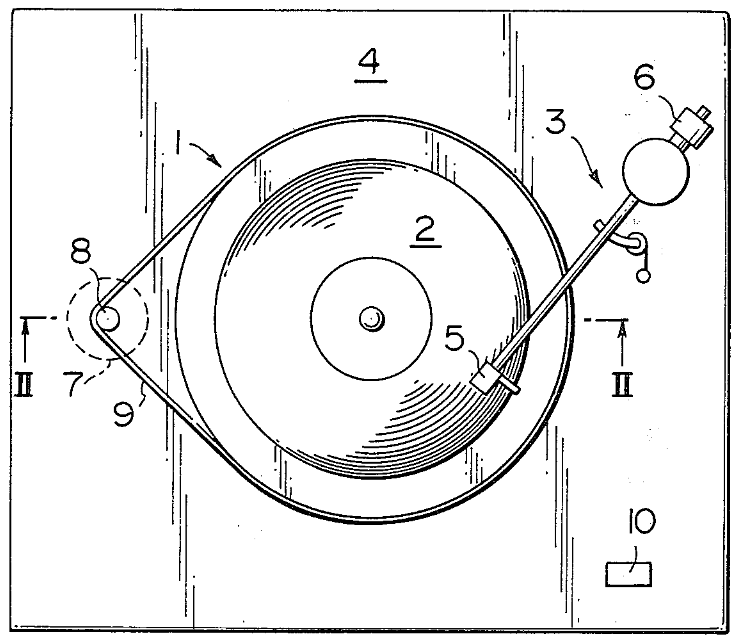
FIG. 1 is a plan view of a record player using an air supported turntable assembly according to the present invention.

Referring to FIG. 1, there is illustrated a record player simplified in structure for convenience in explanation. The player comprises a turntable assembly 1 embodying the present invention and a tone arm 3 which is pivotally mounted to a stand (not shown) secured on a base plate 4. A pickup cartridge 5 is secured to the front end of the tone arm 3 to pick up muscial information or the like from a record 2 which is rotated on the turntable 1. At the rear end of the tone arm 3 is slidably mounted a balance weight 6 to compensate for the weight of the front portion of the arm and apply a suitable stylus force to the stylus of the cartridge 5. A cueing control is mounted on the base plate 4 to pivotally move the tone arm 3 in the vertical direction to set the stylus of the cartridge 5 in the groove of the record 2 and release the stylus from the record. A motor 7 is mounted to the base plate 4 with its rotating shaft 8 upwardly extending from the plate. A belt 9 is stretched between the shaft 8 and the outer periphery of the turntable 2 to rotate the turntable. Any other driving systems, such as a string drive or an idler wheel drive, may, of course be used. On the base plate is mounted a switch 10 to turn the motor 7 on or off.

Figures 2, 4:
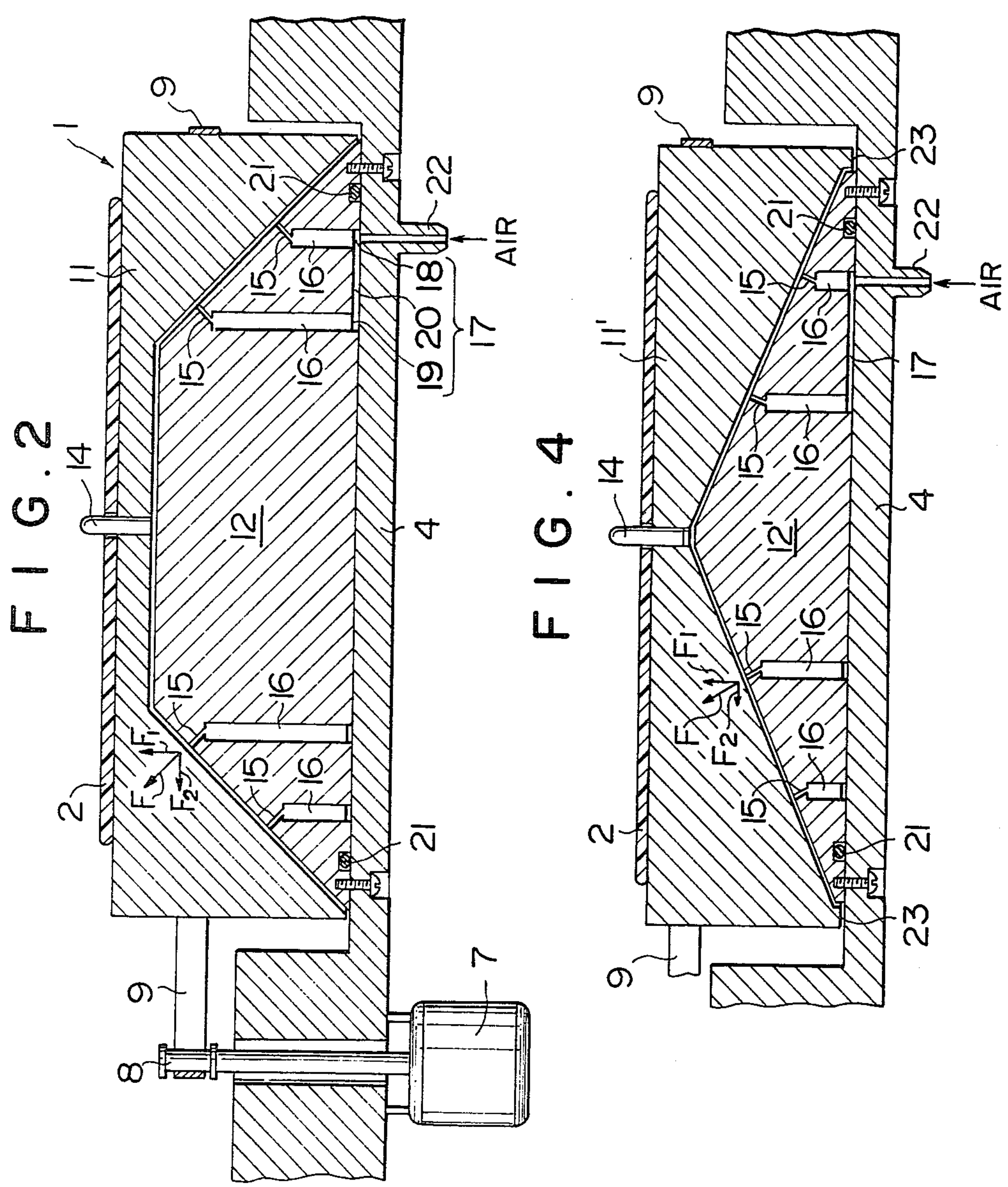
FIG. 2 is a sectional view taken along line II—II of FIG. 1, showing a turntable assembly according to one embodiment of the invention.
FIG. 4 is a sectional view of an alternative embodiment of the turntable assembly.

Referring to FIG. 2, the air supported turntable assembly 1 of the invention is more specifically illustrated. The air supported turntable assembly comprises a rotatable member 11 and a stationary member 12 which floatingly supports the movable member 11. The upper surface of the movable member 11 is flattened suitable to receive the record 2 thereon. A center pin 14 is fixed at the center of the upper surface to receive the center hole of the record. The lower surface of the rotatable member 11 is recessed over substantially the whole of its lower surface in the configuration of a frustocone having its longitudinal axis aligned with the longitudinal axis of the center pin 14, that is with the rotational axis of the turntable 11.

The stationary member 12 is fixedly secured on the base plate 4 and is formed in the same frustoconical configuration as the recess of the rotatable member 11. An appropriate number of orifices 15 are provided at the inclined area of the stationary member 12. The number of the orifices 15 is not limited but shall be as many as possible to provide uniform air pressure distribution over the inclined area. In this embodiment, twelve orifices are provided at each of two circular lines surrounding over the inclined area. The orifices are of a very small diameter; for example 0.05–0.2 mm. Since it is difficult to make fine orifices of such small diameter, it is preferable to prepare a separate element having the prescribed orfice and fit it to each corresponding position of the stationary member 12. Alternatively, a ruby bearing with a hole of 0.15 mm diameter as used in wristwatches or the like may be utilized.

The members 11 and 12 may be made of aluminium. In particular, the surfaces of the inclined areas of both members may be hardened by anodization treatment. Further, the surfaces are coated with a thin film of polytetrafluoroethylene so that the rotatable member can smoothly start and stop. But, it is, of course, not intended to limit the material and treatment into the above mentioned ones.

The angle of the inclined area of the members is suitably selected to resolve the air pressure acting thereon an upward force and a centrifugal force. These forces will be described hereinafter. One of the angle of the inclination is fifteen degrees, but another angle can be selected, for example, forty-five degrees as shown in the drawings.

Figure 3:
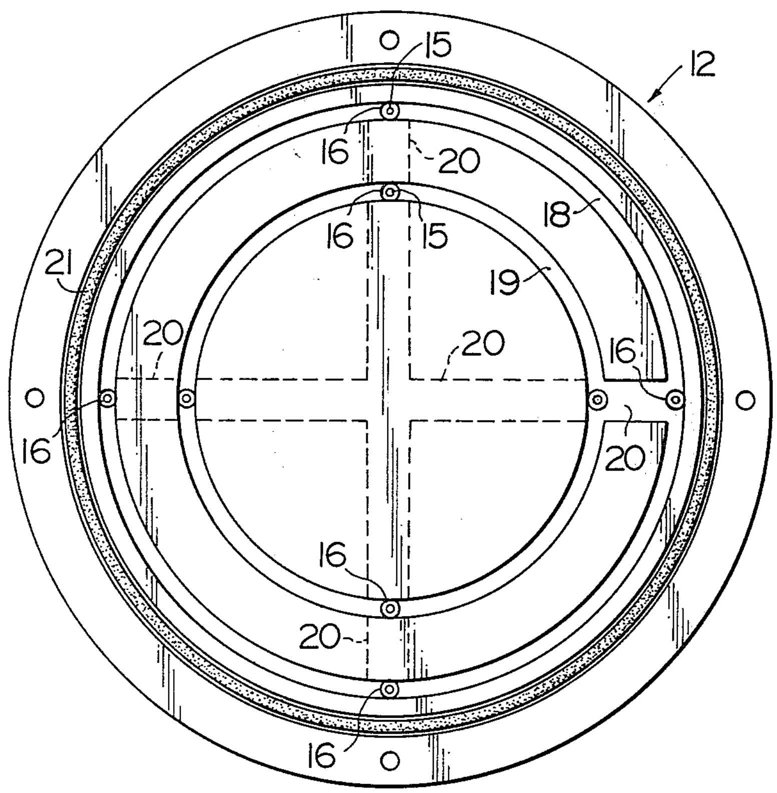
FIG. 3 is a bottom view of the stationary member of the turntable of FIG. 1.

Air passages 16 are connected to the respective orifices 15 to supply pressured air or other gas. The diameter of the passages 16 can be made relatively larger than that of the orifices 15; for example, on the order of 5 mm. The passages 16 are air-communicated with each other by a common path 17. The common path 17 is formed on the lower surface of the member 12, as best illustrated in FIG. 3. The path 17 comprises an outer ring-shaped groove 18, an inner ring-shaped groove 19, and one or more radially running linear grooves 20 to air-communicate with the outer and inner grooves. Alternatively, the common path may be made of a single common circular space which communicates with all of the passages 16 (or the orifices 15). An O-shaped ring 21 of rubber or the like is mounted on the area outside the outer groove 18 to prevent air leakage from the common path 17. The stationary member 12 of the turntable is fixedly secured on the base plate 4 by any suitable fastener means, such as bolts, screws, nails, adhesives or the like. The ring 21 maintains an air-tight seal between the stationary member 12 and the base plate 4. An inlet 22 for air or other gas is provided on the lower surface of the base plate 4 in communication with the common path 17 to supply pressured air or other gas. To the inlet 22 is connected a pressured air or gas source (not shown) which can be of relatively low pressure, such as 0.1–0.5 $Kg/cm^2$. A diaphragm pump may preferably be used.

In operation, prior to energization of the motor 7, the pressured air is supplied to the inlet 22 (for example, at the pressure of 0.2 Kg/cm$^2$) and passed through the common path 17 communicating with the respective passages 16. Each of orifices 15 blows the air onto the opposing surface of the rotatable member 11 with an increased air flow rate acquired by passing through the very fine hole of the orifice. The pressured air from the orifices 15 serves to push the inclined surface of the rotatable member 11 with a force F. The force F can be divided to an upward force $F_1$ and an outward radial force $F_2$. Where twenty-four orifices 15 are uniformly distributed over the inclined surface of the stationary member 12 and the degree of the inclination is fifteen degrees, the total upward forces $F_1$ is 31.7 Kg. The total upward forces serve to float the rotatable member with a very small distance of 0.07 mm so that there is no friction between the lower surface of the rotatable member 11 and the upper surface of the stationary member 12. As each force $F_2$ pushes the inclined portion of the movable turntable 11 in the radially outward direction with substantially equal strength, the turntable can be turned about the longitudinal axis of the frustoconical fixed member 12 or the axis of the center pin 14 so that no center shaft is required on the lower surface of the movable member 11. The total centrifugal force is 8.5 Kg When the motor 7 is energized, the rotatable member 11 is rotated via a belt 9 about the axis of the frustoconical stationary member 12, which is aligned with the center pin 14. Since the rotatable member 11 is frictionlessly supported, the rotatable member 11 is smoothly and uniformly turned. An air supported rotatable member can be made heavier than the conventional turntable so that a high moment of inertia is produced. Particularly, in the rotatable member of this embodiment, the weight is incrementally increased from the inner area to the outermost edge so that, in comparison with the prior air supported turntable, a high moment of inertia is produced to make the rotation of the turntable more stable than in the conventional air supported turntable.

Figure 5:
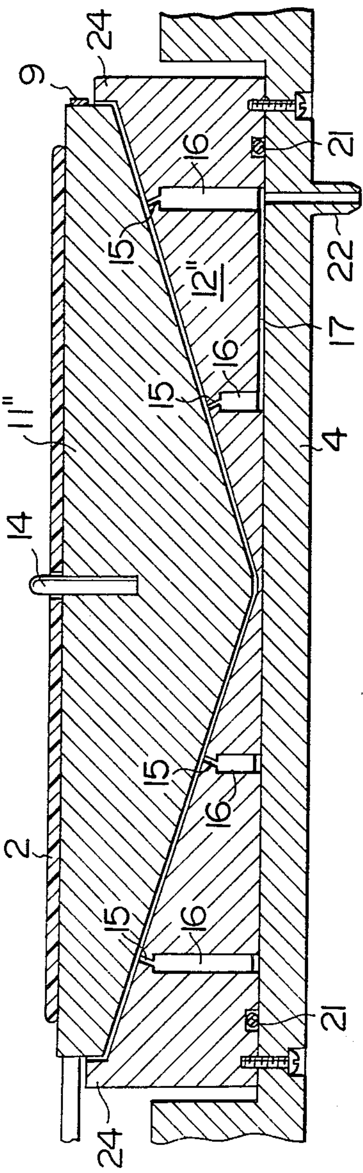
FIG. 5 is a sectional view of another embodiment of the turntable assembly of the invention.

FIGS. 4 and 5 illustrate modified embodiments of the invention which are similar to that above described with the exception that the rotatable and fixed members are made in different configurations.

In FIG. 4, the stationary member 12' is made with a conical configuration and the rotatable member 11' is recessed with the same conical configuration to be received on the stationary member 12'. On the outermost edge of the rotatable member 11' is extended a circular flange 23 to encircle the upright periphery of the stationary member 12'. The flange 23 serves to facilitate the stabilized rotation of the rotatable member 11'. For the same reason, such flange may also be provided on the rotatable member 11 of FIG. 2.

In the further embodiment shown in FIG. 5, the upper surface of the stationary member 12'' is recessed with a conical configuration on which the conicaly raised portion of the rotatable member 11'' is floatingly supported by air jetted from the orifices 15. An upright circular flange 24 is provided over the outermost edge on the stationary member 12'' to encircle at least a portion of the upright periphery of the rotatable member 11''. The flange 24 serves to facilitate the uniform floating and flutterless rotation of the rotatable member 11''. In the modified embodiments, the longitudinal axis of the cone is, of course, aligned with the longitudinal axis of the center pin 14.

Figure 6:
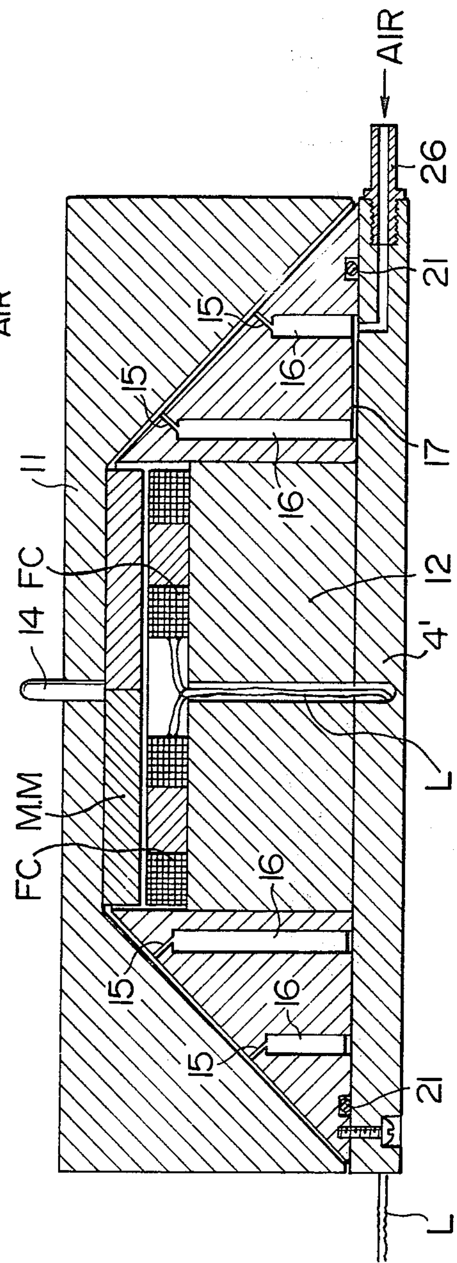
FIG. 6 is a sectional view of a further modified embodiment of the turntable assembly, similar to the embodiment of FIG. 2, having a direct drive motor built therein and an auxiliarily separable base plate from a base plate of the record player.

FIG. 6 illustrates an embodiment in which a direct drive motor is assembled into an arrangement similar to the turntable assembly of FIG. 2. The motor comprises fixed coil elements FC and moving magnet elements MM. The fixed coil elements FC are secured to a cylindrical recess which is formed in the upper flattened surface of the stationary member 12. The moving magnet elements MM are secured to the lower flattened surface of the rotatable member 11 to face the coil elements arranged surface across a small gap. Electric power is fed through a line L to energized the coil elements FC. Such direct drive system is preferable to the belt, string or idler wheel drive system or the like because there is no lateral pulling force applied to the periphery of the rotatable member 11.

Further, an auxiliary base plate 4' is provided in place of the base plate of the record player. The auxiliary base plate 4' is separable from the body of the record player. An air inlet 26 is mounted on one upright edge of the auxiliary base plate 4' in the horizontal direction. Such arrangement is advantageous that an operator or user can handle only the turntable assembly independent of the other portions of the record player. Further, the stiffness of the auxiliary base plate can be increased whereby high resistance to the vibration (or vibration proof) can be ensured. Alternatively, the auxiliary base plate may be bonded to the thick stone or the like. It is important that the auxiliary separable base plate can, of course, be applied to the foregoing embodiments as illustrated in FIGS. 2, 4 and 5.

In the present invention, the angle of inclination of the frustocone or cone may be selected to define the upward force and the outward radial force to the desired amount. Further the pressure of air also may be selected to produce the desired total amount of the forces.

While there has been described what is at present considered to be preferred embodiments of the invention, it will be understood by those skilled in the art that the foregoing descriptions are preferred embodiments of the disclosed turntable assembly and that various changes and modifications may be made in the invention without departing from the scope thereof.

What is claimed is;

1. An air supported turntable assembly for record players adapted to be used with a record disc having a center hole, said turntable assembly including a rotatable member having a flattened upper surface provided with a center pin to receive the center hole of a record disc, a stationary member placed beneath the rotatable member and having an upper surface facing the lower surface of the rotatable member, means for introducing pressurized air between the rotatable and stationary members to establish a hydrostatic air bearing between the members to float and freely and substantially frictionlessly rotate the rotatable member with record disc thereon, and means for rotating the rotatable member, characterized in that the upper surface of the stationary member is formed of at least a part-conical configuration having a center axis coaxial with the center pin on the rotatable member and an inclination rising from the outer periphery of said upper surface or the vicinity thereof toward the center axis to such an extent that the area of the conical surface becomes substantially larger than the remaining area of said one surface the lower surface of the rotatable member is provided with a recess which is complementary to said part-conical configuration to receive said upper surface of the stationary member in a coaxial manner to gradually increase the mass between the flattened upper surface and the conical recess radially outward so that the moment of inertia of the rotatable member is relatively increased, and said air introducing means comprises a plurality of orifices formed on the inclined surface of the stationary member and located substantially equal distance from each other along the circumference of said inclined surface whereby said rotatable member is substantially frictionlessly supported on said stationary member and can be rotated about the center pin thereon without a rotating center shaft.

2. The assembly as set forth in claim 1 wherein said stationary member is of a frustoconical configuration and the complementary recess is formed on the lower surface of said rotatable member.

3. The assembly as set forth in claim 1 wherein the upper surface of said stationary member is of a conical configuration and the complementary recess is formed on the lower surface of said rotatable member.

4. The assembly as set forth in claim 2 or 3 wherein an upright circular flange is provided at the outermost edge of one of the rotatable and stationary members to encircle at least a portion of the upright periphery of the other.

5. The assembly as set forth in claim 1, wherein said means for rotating the rotatable member comprises a motor mounted on the base plate means and having a shaft extending upwardly on the base plate means, and a belt stretched between said shaft and the outer periphery of said rotatable member.

6. The assembly as set forth in claim 1 wherein said means for rotating the rotatable member comprises moving magnetic elements secured to the lower surface of said rotatable member and fixed coil elements secured to the upper surface of said stationary member.

* * * * *